United States Patent
Scott

[15] 3,680,092
[45] July 25, 1972

[54] RANGING SYSTEM USING PHASE DETECTION

[72] Inventor: Gerald C. Scott, Ann Arbor, Mich.
[73] Assignee: Ford Motor Company, Dearborn, Mich.
[22] Filed: March 30, 1970
[21] Appl. No.: 23,651

[52] U.S. Cl. ..................................343/7 A, 343/7.5, 343/9
[51] Int. Cl. .........................................G01s 9/04, G01s 9/46
[58] Field of Search.........................................343/7 A, 7.5, 9

[56] References Cited

UNITED STATES PATENTS

| | | | |
|---|---|---|---|
| 3,126,540 | 3/1964 | Nilssen | 343/9 |
| 3,152,326 | 10/1964 | Merlo | 343/9 X |
| 3,191,171 | 6/1965 | Zuefeldt et al. | 343/7 A |

Primary Examiner—T. H. Tubbesing
Attorney—John R. Faulkner and Glenn S. Arendsen

[57] ABSTRACT

A modulated alternating waveform produced by an oscillator is transmitted to a target and a receiver receives reflections of the waveform from the target. The waveform of the modulation also is applied through a voltage controlled phase shifter and squaring amplifier to a synchronous detector coupled to the receiver. In the synchronous detector, the signal and any spurious noise from the receiver is multiplied by the waveform from the squaring amplifier in a manner that cancels out all spurious noise. A DC voltage representative of the phase shift produced in the modulation of the received signal by the distance from transmitter to target to receiver is applied to an integrator. Integrator output is applied to the voltage controlled phase shifter and is representative of the distance traveled by the waveform.

21 Claims, 5 Drawing Figures

INVENTOR.
GERALD C. SCOTT
BY John R. Faulkner
Glenn S. Arendsen
ATTORNEYS

INVENTOR.
GERALD C. SCOTT
BY
John R. Faulkner
Glenn S. Arendsen
ATTORNEYS

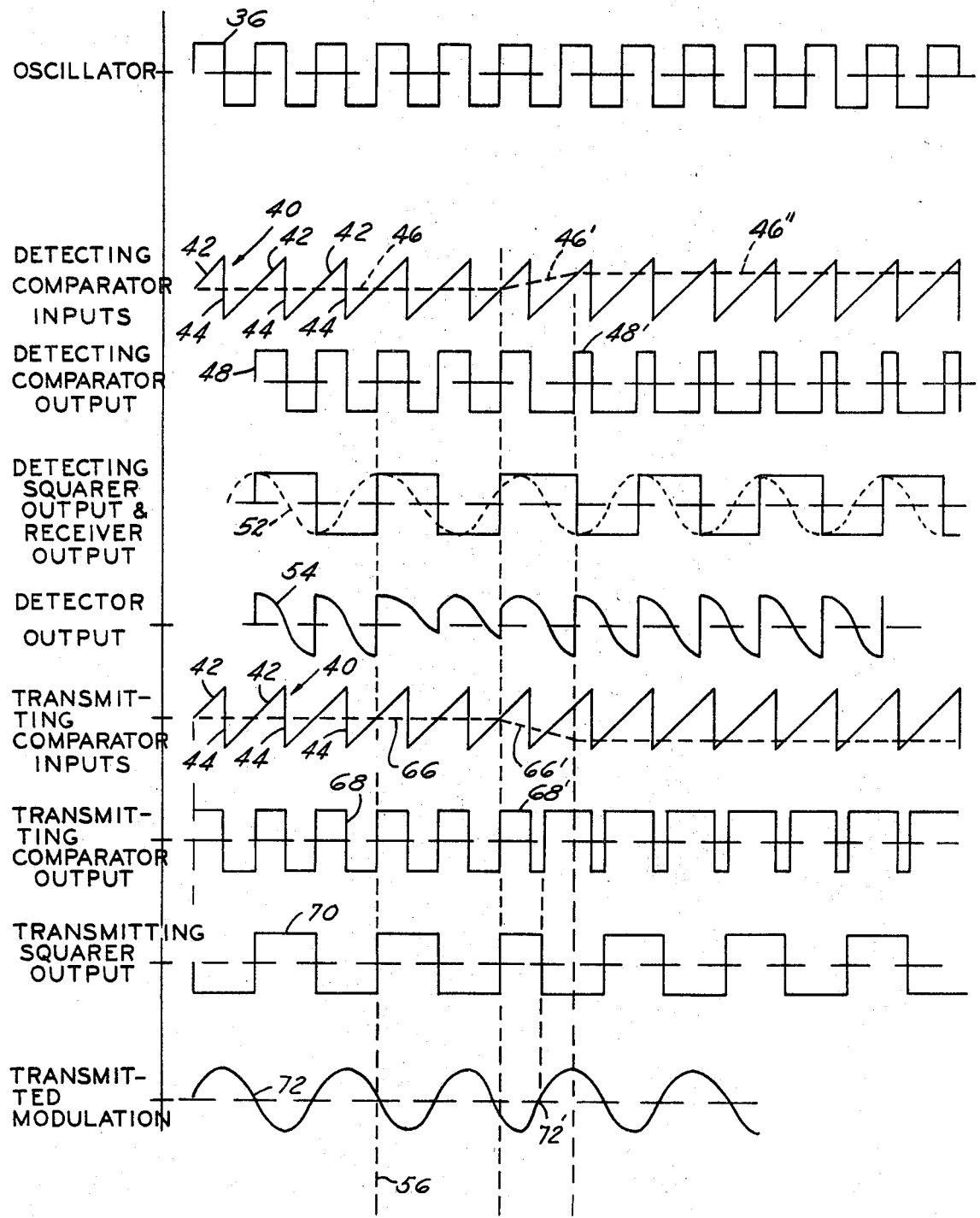

RANGING SYSTEM USING PHASE DETECTION

BACKGROUND OF THE INVENTION

Highway safety has become a major consideration of modern society, and forecasts of the greatly increasing number of vehicles expected on the highways in the future indicate that the safety problem soon will increase by several orders of magnitude. Numerous techniques have been proposed recently for controlling a vehicle according to the amount of its available headway, i.e., the distance from the vehicle to an object located in its path. Essential to such techniques is a ranging system for measuring the available headway under the conditions existing on the highways.

Early ranging systems typically used the Doppler effect to determine the closing rate of a vehicle on a forwardly located object and used the closing rate to estimate available headway. Later systems measured intensity changes in electromagnetic waves resulting from the distance traveled by the waves. More sophisticated systems have attempted to utilize the phase shift of a wave that has been transmitted toward and reflected from a forwardly located object. The excessive amounts of spurious electrical noise generated by vehicle ignition equipment, radio and television transmission devices, high tension power transmission lines and transformers and the many other electrical and electronic devices found on and near modern highways renders proper detection and discrimination of the reflected signals extremely difficult. Additionally, prior art ranging systems generally are unable to distinguish with any significant reliability between its own reflected signal and the signal of similar systems on other vehicles; this creates serious difficulties not only when two vehicles are meeting but also when one vehicle is passing another.

SUMMARY OF THE INVENTION

This invention provides a ranging system for determining the distance to an object that is capable of distinguishing reflections of its own transmitted wave from virtually all spurious noises. The system is useful particularly on automotive vehicles that operate in high noise environments, for it is capable of detecting and discriminating its reflections from very low signal to noise ratios, typically as low as 1:100. A DC voltage is produced by the ranging system that is directly proportional to the distance traveled by the transmitted wave and is useful readily in electrically actuated vehicle braking and accelerating mechanisms. The system also produces a voltage representative of the rate of change of that distance.

All components of the system are mounted on a single vehicle or installation since the system does not require any cooperating components in other vehicles.

In the system, a signal transmitter is mounted where it can transmit a carrier signal toward a reflecting target. The carrier signal preferably has a frequency between about 1,000 and 330,000 gigahertz. A modulating oscillator modulates the carrier signal with a waveform preferably having a frequency between about 10 kilohertz and 10 megahertz. A signal receiver is located where it can receive reflections of the modulated carrier signal from the reflecting target. Ranging systems for automotive vehicles typically have the transmitter and receiver located in the grille or on top of the instrument panel where the devices have an unobstructed view of the headway path.

A phase detection circuit that not only separates the modulation on the received carrier signal from spurious noises but also determines the phase shift caused by the distance traveled by the modulated carrier signal in moving from the signal transmitter to the target and back to the signal receiver is located in the vehicle. Included in the phase detection circuit is a synchronous detector connected to the modulating oscillator and the signal receiver. The detector operates at the frequency of the modulation so it will detect only received signals having the same frequency, and it produces a DC voltage representative of the phase difference between the modulation on the received signal and the original modulation. An integrator has its input connected to the detector and its output connected to a voltage controlled phase shifter. The phase shifter also is connected to the modulating oscillator and its output is applied to the synchronous detector through a squaring device that squares the signal along the time scale. Thus the phase detection circuit comprises a synchronous detector, an integrator, a voltage controlled phase shifter and a squaring device connected in a closed loop, with the detector also connected to the receiver and the phase shifter also connected to the modulating oscillator. An external output terminal is connected between the integrator and the phase shifter.

Operation takes place in the following manner. An alternating waveform produced by the oscillator is applied through a squaring or dividing device that reduces the frequency by one half to the transmitter where the waveform is converted into a sine wave, applied as modulation to a carrier signal, and transmitted toward the target. Oscillator output also is applied to the voltage controlled phase shifter which shifts the phase thereof according to the voltage received from the integrator. Phase shifter output is applied to a second squaring or dividing device where the signal is squared along the time axis and reduced in frequency by one half. The squared waveform is applied to the synchronous detector along with the target reflections and spurious noise picked up by the receiver.

In the detector, receiver output is multiplied by the squared waveform from the squaring device. Any receiver output having a frequency equal to the squared waveform frequency produces a net DC voltage proportional to the amount of the phase difference between that frequency and the squared waveform while all other signals in the receiver output produce an alternating wave having a net DC voltage of zero. Any DC voltage is applied to the integrator, which multiplies the DC voltage by time and applies the product to the voltage controlled phase shifter. If the phase difference between the inputs to the detector is exactly 90°, detector output is zero and integrator output can be zero. As the phase difference varies from 90°, detector output changes positively or negatively depending on the direction of the phase shift in the received signal. The integrator then produces a DC voltage that is the time integral of the detector output, and this voltage operates in the phase shifter to shift the squared waveform thereof to the point where detector output again returns to zero. The integrator maintains this DC voltage until another phase shift occurs, in which case the same sequence produces another integrator output voltage that operates in the same manner to return detector output to zero. Integrator output voltage thus is related directly to the phase shift and in turn to the range between the transmitter-receiver and the target. In addition, the DC voltage from the detector is directly related to the rate of change of the range.

In a preferred embodiment, the voltage controlled phase shifter includes a ramp generator that produces a linear ramp function having a frequency equal to the oscillator frequency. A comparator receives the ramp function and the DC voltage from the integrator and produces a waveform having a positive portion whenever the ramp function exceeds the integrator voltage and a negative portion whenever the ramp function is less than the integrator voltage. Integrator output thus shifts the point in time at which the waveform begins its positive portion. The squaring amplifier squares the waveform along the time axis by reacting only to positive values of the positive going pulse of each cycle, and applies the resulting waveform to the detector as described above.

The range scale of the ramp generator system is limited as a practical matter to ranges corresponding to about 90° of phase shift since the system cannot discriminate between the waveforms generated on succeeding ramps and a finite time is necessary for each ramp to decay. This range can be virtually tripled by including in the transmitter circuit a mechanism for also shifting the phase of the transmitted wave according to the detected phase difference. To accomplish this, a second comparator is connected into the transmitter circuit and is controlled by the integrator output so integrator output shifts one comparator in one direction and the other comparator in the other direction.

BRIEF DESCRIPTION OF THE DRAWINGS

FIG. 5 is a diagram similar to that of FIG. 4 but showing the relative waveform phases in the FIG. 3 system.

DETAILED DESCRIPTION

Figure 1:
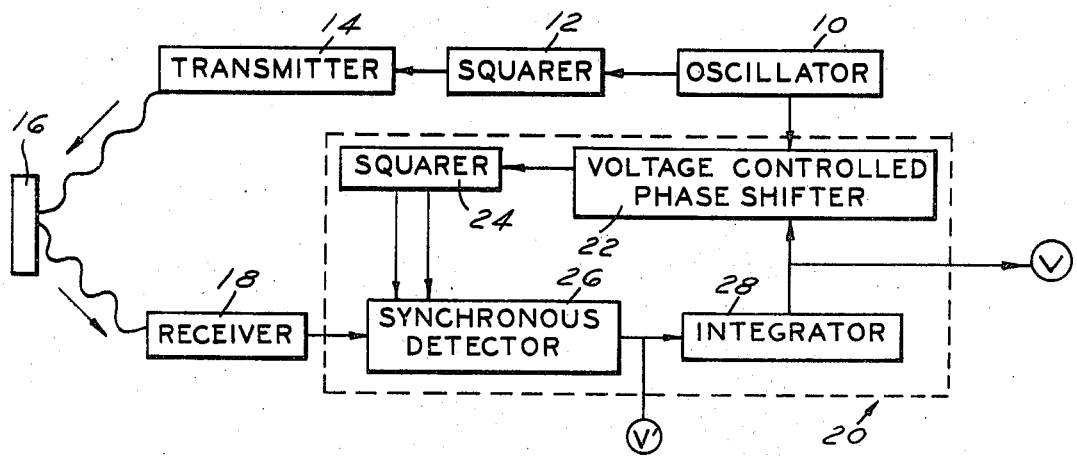
FIG. 1 is a block diagram of a ranging system of this invention showing the phase detection loop circuit made up of the voltage controlled phase shifter, squaring amplifier, synchronous detector and integrator.

Referring to FIG. 1, the modulating oscillator for the system of this invention is indicated by numeral 10. Oscillator 10 preferably produces a square waveform but any other waveform also can be used. The oscillator operates at twice the frequency desired in the transmitted modulation and it is connected through a squarer 12 to the signal transmitter 14. Squarer 12 divides the waveform frequency by two; typically squarer 12 performs its division by producing a square wave in response only to rising positive voltages in the waveform produced by oscillator 10. The squarer also, however, can respond to declining values of negative voltage in the waveform of oscillator 10 or to any predetermined value thereof. Transmitter 14 receives the squared waveform from squarer 12, converts the waveform into a sine wave if necessary and uses the sine wave to modulate a carrier signal received from a carrier oscillator (not shown). The transmitter then transmits the modulated carrier signal forwardly of a vehicle toward a target 16.

A receiver 18 is mounted on the front of a vehicle where it will receive reflections of the modulated carrier signal from target 16. The receiver is connected to a phase detection circuit enclosed by dashed line 20. Phase detection circuit 20 includes a voltage control phase shifter 22 connected in a closed loop configuration with a squarer 24, a synchronous detector 26, and an integrator 28. Oscillator 10 is connected to phase shifter 22 and receiver 18 is connected to synchronous detector 26.

Figure 2:
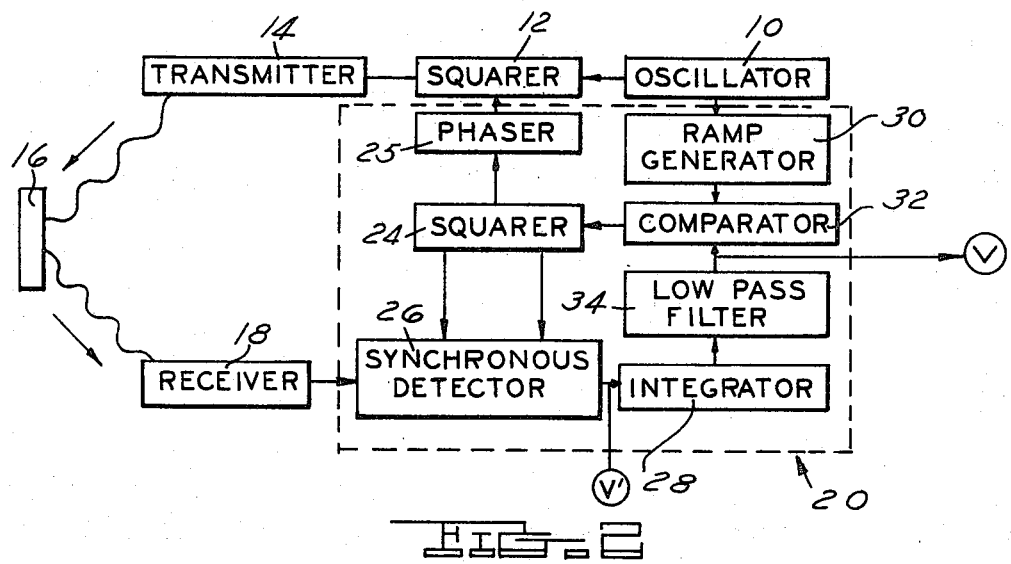
FIG. 2 is a block diagram of an improved version of the invention in which a ramp generator is used to convert oscillator output into a ramp function.

Turning to FIG. 2, the voltage controlled phase shifter 22 preferably is made up of a ramp generator 30 connected to oscillator 10 and a comparator 32 that receives the output of the ramp generator. Comparator 32 also receives the output of the integrator 28 via a low pass filter 34. The output of comparator 32 is applied to squarer 24. Comparator input is applied to an external terminal V and integrator input is applied to an external terminal V'.

Figure 4:
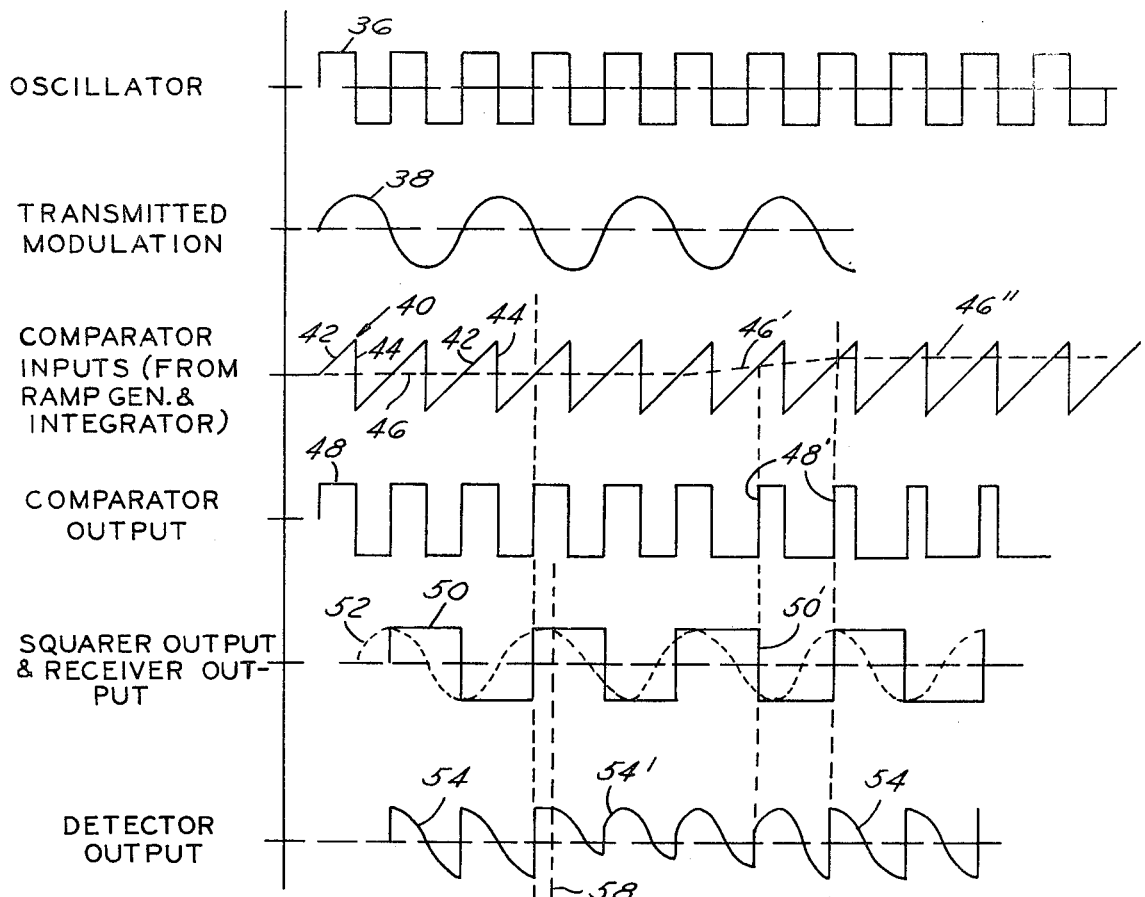
FIG. 4 is a diagram showing the relative phases of the waveforms produced by certain devices of the FIG. 2 system and includes the waveforms present during a phase change.

The operation of the FIG. 2 circuit can be understood more readily by referring also to FIG. 4. As indicated in FIG. 4, oscillator 10 continues to produce an alternating waveform 36. The frequency of this waveform is halved and converted into a sine wave 38 that is transmitted as modulation by transmitter 14.

Ramp generator 30 responds to the square waveform 36 produced by oscillator 10 to produce a sawtooth waveform 40, each cycle of which includes a linearly increasing ramp 42 terminated by a rapidly decreasing portion 44. Ramp 42 rises linearly from zero when waveform 36 begins its positive portion to a predetermined positive voltage that is reached when waveform 36 completes its positive portion, declines rapidly along portion 44 to a negative voltage having substantially the same value as the predetermined positive voltage, and then begins rising along the succeeding ramp 42 while waveform 36 completes its negative portion. Ramp 42 passes through zero when waveform 36 passes through zero.

Waveform 40 is one of the inputs to comparator 32 which has as its second input a DC voltage 46 from integrator 28. Comparator 32 produces a square waveform 48 that begins a positive portion whenever the voltage of ramp 42 exceeds the DC voltage 46 from the integrator. Each positive portion of waveform 48 lasts until waveform 40 becomes negative at which point waveform 48 also produces a negative portion that lasts until the voltage of ramp 42 rises above DC voltage 46. When integrator output 46 is zero, comparator output is a symmetrical square waveform 48 corresponding to the waveform 36 of oscillator 10, but as will be seen, any changes in the value of DC voltage 46 produce variations in the shape and phase of waveform 48.

Squarer 24 receives the output waveform 48 from comparator 32 and responds only to positive going pulses in waveform 48 to produce a square waveform 50. Squarer 24 can be a binary flip flop that becomes positive at one positive going portion of waveform 48, negative at the next positive going portion of waveform 48, positive at the next positive going portion of waveform 48, etc. Waveform 50 has a frequency equal to that of transmitted modulation 38 and a phase determined by the phase of comparator 32 output. The phase of waveform 50 initially is 180° from that of transmitted waveform 38 when integrator output is zero as shown in the portion of FIG. 4 to the left of dashed vertical line 56. Other initial phase arrangements can be used and a phaser 25 is connected between squarer 24 and squarer 12 to provide desired initial phasing. Waveform 50 is applied to synchronous detector 26.

Detector 26 also receives the output of receiver 18, which output includes a waveform 52 corresponding in frequency and shape to the transmitted modulation waveform 38, assuming that the transmitted waveform has struck a target 16 and has been reflected back toward receiver 18. In accordance with well known principles, the phase of waveform 52 will be delayed from the phase of transmitted waveform 38 by an amount directly proportional to the distance traveled by the modulation from the transmitter 14 to the target 16 and then to receiver 18. This phase delay is used to determine the distance between a vehicle carrying transmitter 14 and receiver 18 and an object 16 located in the headway path of the vehicle. In FIG. 4, the initial phase delay is assumed to be 90° and waveform 52 thus lags waveform 38 by 90°.

As pointed out above, detector 26 multiples the output of receiver 18 by wave 50. If the received waveform 52 lags transmitted waveform 38 by 90° as shown in the left portion of FIG. 4, the detector produces an output waveform 54 as shown that has a net DC voltage of zero. The net DC output of detector 26 is applied to integrator 28 which applies the time integrated product of the output to comparator 32 as DC voltage 46. So long as received waveform 52 lags the transmitted waveform 38 by 90°, integrator output 46 remains at zero.

At the point in time represented by vertical dashed line 56, it is assumed that the distance between the vehicle and the target increases, which of course results in an increased delay in the phase of received waveform 52. This increased delay takes place gradually but is shown for illustrative purposes in FIG. 4 as an immediate lag of about 45° that takes place in the space between vertical dashed lines 56 and 58.

When the delayed waveform 52 is multiplied by waveform 50 in detector 26, the detector output assumes the modified waveform 54' shown on the right side of vertical line 58. Waveform 54' has a definite net positive DC value which integrator 28 converts into a steadily rising DC voltage 46'. Since comparator 32 is triggered only when the voltage of ramp function 42 is more positive than the voltage 46 of integrator 28, the rising integrator voltage 46' delays the triggering point of the comparator to produce the modified comparator output waveform 48'. This in turn delays the phase of the waveform produced by squarer 24 as indicated at numeral 50'. DC voltage 46' from integrator 28 continues to rise until the delay in the squarer output catches up with the delay in received waveform 52, which is illustrated in FIG. 4 as occurring at dashed vertical line 60. When squarer output 52 again is exactly 90° out of phase with received waveform 52, detector 26 again produces its symmetrical waveform 54 which has a net DC value of zero. The DC output of integrator 28 then stops increasing but maintains its increased level 46'' to maintain the 90° relationship between squarer output and received waveform 52. Received waveform 52 now lags the transmitted waveform 38 by about 135° and DC voltage 46'' from integrator 28 is representative of this additional phase lag.

Similar operation maintains the DC voltage from the integrator representative of the distance between the transmitter-receiver and the target. Thus, further increases in the distance produce a greater delay in received wave 52, which increases voltage 46 still further to compensate therefor. If the distance decreases, the phase delay in received wave 52 also decreases and detector 26 begins producing a net negative DC voltage that reduces the output of integrator 28 and can make that output negative in value. Voltage 46 and its varied voltages 46' and 46'' appear at external terminal V where values thereof always represent range. The net DC voltage 54, 54' of the detector output appears at external terminal V' where values thereof always represent the rate of change of the range.

Any spurious noises or other waveforms differing even slightly in frequency from received waveform 52 that are picked up by receiver 18 produce alternating waves having a net value of zero when multiplied in detector 26 by waveform 50. Spurious noises differ significantly from the frequency of waveform 52 produce a net DC voltage of zero within a very few cycles, which occurs so rapidly that integrator 28 does not react thereto. Received waveforms differing only slightly from waveform 52, however, might produce an AC signal that is picked up and integrated by integrator 28. Low pass filter 34 removes any such ripples from the output of the integrator to prevent an undesired reaction of comparator 32 to such signals.

Figure 3:
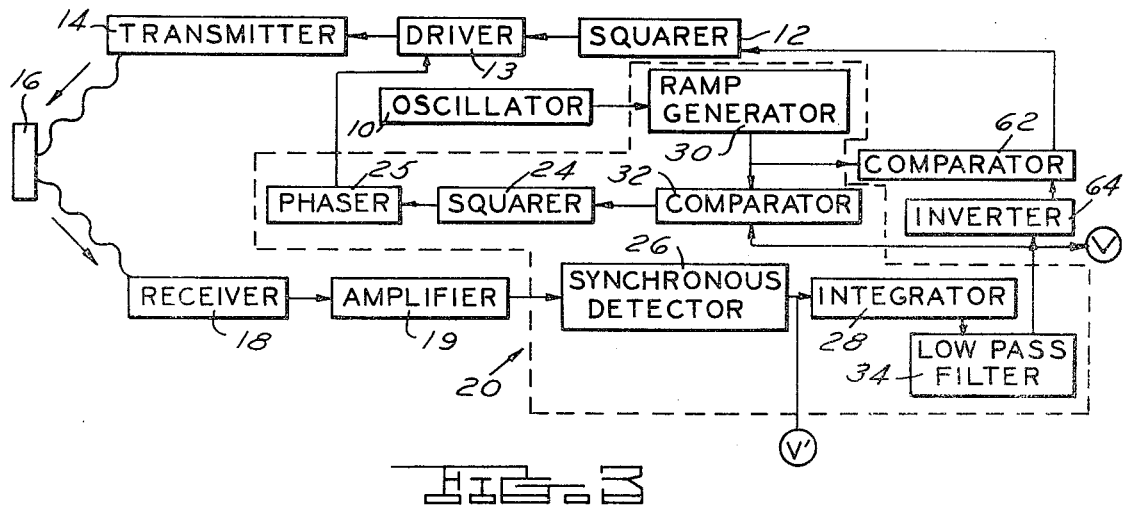
FIG. 3 is a block diagram showing a system in which phase changes act in two separate comparators, one shifting the point on the ramp function at which the transmitted wave is sent and the other shifting the point on the ramp function at which the detecting signal waveform is applied to the synchronous detector.

The FIG. 3 circuit is similar to the circuit shown in FIG. 2 but includes additional components that effectively triple the range of the system. Each of these additional components is described below. If necessary, a driver 13 can be connected between squarer 12 and transmitter 14 and an amplifier 19 can be connected between receiver 18 and detector 26 to increase the ranging ability of the transmitter and receiver.

A transmitting comparator 62 is connected between ramp generator 30 and transmitting squarer 12, and an inverter 64 connects low pass filter 34 to comparator 62. Low pass filter 34 also is connected to the detecting comparator 32 as in FIG. 2.

FIG. 5 illustrates the operation of FIG. 3. Phase detection circuit 20 operates in a manner identical to that of FIG. 2 as described above. The output of integrator 28 is applied not only to comparator 32 but also to inverter 64 which in turn applies the inverted integrator DC voltage (represented by numeral 66) to transmitting comparator 62. Transmitting comparator 62 thus receives the waveform 40 from ramp generator 30 and the inverted DC voltage 66 from integrator 28.

The transmitting comparator 62 functions like detecting comparator 32 in that it produces a waveform 68 that begins a positive portion each time the voltage of ramp 42 exceeds the DC voltage 66 in comparator 62 and produces a negative portion whenever the voltage of the ramp function 40 is less than the inverted voltage 66. Transmitting squarer 12 responds only to positive going pulses in waveform 68 to produce a square waveform 70. Driver 13 converts square waveform 70 into an inverted sine wave function 72 that is transmitted toward the target by transmitter 14.

If an increasing distance between transmitter-receiver and target 16 produces a greater lag in the phase of received wave 52 as illustrated at dashed vertical line 56 in FIG. 5, the resulting DC output from integrator 28 is applied directly to comparator 32 and in inverted form to comparator 62. Comparator 32 and squarer 24 begins delaying the detecting signal as described above. Simultaneously, transmitting comparator 62 responds to the decreasing DC voltage 66' to produce a comparator output 68' having an advancing phase. Transmitting squarer 12 responds to comparator output 68' to produce a corresponding advance in the phase of the transmitted modulation as at 72'. Thus, while the phase of the detecting squarer 24 is retarded to begin catching up with the increased delay in the received waveform 52, the phase of the transmitted modulation is advanced, which produces a corresponding advance in the phase of received waveform 52. Phase changes that move the positive integrator voltage 46 all the way to the top of ramp 42 and simultaneously move the inverted voltage 66 all the way to the bottom of ramp 42 thus can be measured. Since the amount of time necessary for ramp delay remains about the same in the FIG. 3 system as in the FIG. 2 system, about 270° are available for range measuring, which is 3 times the amount available in the FIG. 2 system.

When the systems are used in production vehicles, a large number of slightly different modulation frequencies are provided. Because of the high degree of discrimination inherent in the system, interference between similar systems on different vehicles is minimal. Transmitters and receivers also are designed to transmit and receive narrow beams only.

Thus the invention provides a ranging system that is highly accurate and very capable of discriminating its signals from spurious noise. The system produces a DC voltage directly representative of range, and also produces a DC voltage representative of the rate at which the range is changing. Such DC voltages are useful directly to control various items of vehicle equipment.

I claim:

1. An electronic ranging system comprising signal transmitting means for directing a carrier signal toward a reflecting target,
   modulating means for modulating said carrier signal,
   signal receiving means for receiving reflections of the modulated carrier signal, and
   phase detection means for determining the phase shift resulting from the distance traveled by said modulated carrier signal from said signal transmitting means to said signal receiving means, said phase detection means including a voltage controlled phase shifting means connected to the modulating means, synchronous detector means connected to said phase shifting means and said signal receiving means, said detector means operating at the frequency of the modulation to detect only received signals having the same modulation frequency, and an integrator receiving the output of said synchronous detector means, said integrator producing a DC output signal representative of the phase shift resulting from the distance traveled by said modulation, the output of said integrator being connected to said phase shifting means and to an output terminal.

2. The ranging system of claim 1 in which the phase shifting means comprises a ramp generator connected to said modulating means for generating a repeating ramp function having a ramp increasing at a substantially linear rate, and a comparator connected to said ramp generator and said integrator, said comparator comparing the integrator output voltage with the instantaneous voltage of said ramp to produce an alternating signal having a phase determined by the integrator output voltage.

3. The ranging system of claim 2 in which the modulating means comprises an oscillator operating at twice the frequency of said modulation and a dividing means connected between said oscillator and said transmitting means for reducing oscillator frequency to modulation frequency, and the phase detection means comprises a second dividing means connected to said comparator for reducing the alternating signal from said comparator to modulation frequency, said second dividing means also squaring the comparator signal along the time axis.

4. The ranging system of claim 3 comprising a phaser connected between said first and second dividing means to establish a predetermined initial phase relationship between the outputs of said dividing means.

5. The ranging system of claim 4 comprising a low pass filter connected between said integrator and said comparator, said output terminal being connected between said filter and said comparator.

6. The ranging system of claim 5 comprising a second output terminal connected between said detector and said integrator, said second output terminal displaying a DC voltage representative of the rate of change of said range.

7. The ranging system of claim 6 comprising a second phase shifting means for shifting the phase of the transmitted modulation in response to the voltage of the integrator.

8. The ranging system of claim 7 in which the second phase shifting means shifts the phase of the transmitted modulation in the opposite direction of the first phase shifting means.

9. The ranging system of claim 1 comprising a second output terminal connected between said detector and said integrator, said second output terminal displaying a DC voltage representative of the rate of change of said range.

10. The ranging system of claim 1 comprising a second phase shifting means for shifting the phase of the transmitted modulation in response to the voltage of the integrator.

11. A ranging system for determining the available headway of an automotive vehicle comprising signal transmitting means located on said vehicle for directing a carrier signal forward of the vehicle, modulating means connected to said transmitting means for modulating said carrier signal, signal receiving means located on said vehicle for receiving reflections of the modulated carrier signal from a target located forwardly of said vehicle, synchronous detector means connected to said modulating means and said receiving means, said detector means multiplying receiving means output by a waveform obtained from said modulating means to produce a net DC voltage representative of the phase difference between the modulation and any signal in the receiving means output having the same frequency as the modulation, integrator means for integrating detector means output with respect to time, said integrator means producing a DC output voltage that is applied to an output terminal, said DC voltage at said output terminal being representative of available headway, and phase shifting means connected to said integrator means for shifting the phase of the waveform obtained from the modulating means according to the output of the integrator means, the output of said phase shifting means being applied to the detector means.

12. The ranging system of claim 11 in which the phase shifting means comprises a ramp generator connected to said modulating means for generating a repeating ramp function having a ramp increasing at a substantially linear rate, and a comparator connected to said ramp generator and said integrator, said comparator comparing the integrator output voltage with the instantaneous voltage of said ramp to produce an alternating signal having a phase determined by the integrator output voltage.

13. The ranging system of claim 12 in which the modulating means comprises an oscillator operating at twice the frequency of said modulation and a dividing means connected between said oscillator and said transmitting means for reducing oscillator frequency to modulation frequency, and comprising a second dividing means connected between said comparator and said synchronous detector means for reducing the alternating signal from said comparator to modulation frequency, said second dividing means also squaring the comparator signal along the time axis.

14. The ranging system of claim 13 comprising a phaser connected between said first and second dividing means to establish a predetermined initial phase relationship between the outputs of said dividing means.

15. The ranging system of claim 14 comprising a low pass filter connected between said integrator and said comparator, said output terminal being connected between said filter and said comparator.

16. The ranging system of claim 15 comprising a second output terminal connected between said detector and said integrator, said second output terminal displaying a DC voltage representative of the rate of change of said available headway.

17. The ranging system of claim 16 comprising a second phase shifting means for shifting the phase of the transmitted modulation in response to the voltage of the integrator.

18. The ranging system of claim 17 in which the second phase shifting means shifts the phase of the transmitted modulation in the opposite direction of the first phase shifting means.

19. The ranging system of claim 11 comprising a second output terminal connected between said detector and said integrator, said second output terminal displaying a DC voltage representative of the rate of change of said available headway.

20. The ranging system of claim 11 comprising a second phase shifting means for shifting the phase of the transmitted modulation in response to the voltage of the integrator.

21. The ranging system of claim 20 in which the second phase shifting means shifts the phase of the transmitted modulation in the opposite direction of the first phase shifting means.

* * * * *